United States Patent [19]

Kikegawa et al.

[11] Patent Number: 4,560,414
[45] Date of Patent: Dec. 24, 1985

[54] MODIFIER FOR PAVING ASPHALT

[75] Inventors: Shinko Kikegawa, Koganei; Takao Arai, Sayama; Norio Yamamoto, Omiya; Kiyoharu Ozaki, Tokyo, all of Japan

[73] Assignee: Nippon Hodo Co., Ltd., Tokyo, Japan

[21] Appl. No.: 571,651

[22] Filed: Jan. 17, 1984

[51] Int. Cl.$^4$ .............................................. C08L 95/00
[52] U.S. Cl. ............................ 106/281 R; 106/273 R; 208/23
[58] Field of Search ..................... 106/273 R, 281 R; 208/23

[56] References Cited

U.S. PATENT DOCUMENTS 3,632,418  1/1972  Draper .................................. 428/219
3,897,380  7/1975  Walaschek ........................... 524/565
4,227,933 10/1980  McAllister, Jr. ................. 106/281 R

*Primary Examiner*—Paul Lieberman
*Assistant Examiner*—Amelia B. Yarbrough
*Attorney, Agent, or Firm*—Lowe, King, Price & Becker

[57] ABSTRACT

A modifier for paving asphalt, which comprises Trinidad Epuré having a maximum size of less than 25 mm and a pulverulent solid having a maximum size of less than 2.5 mm, the powder comprising essentially a substance having a higher softening point than Trinidad Epuré and compatibility with paving petroleum asphalt, wherein the volume of the powdery solid is 0.8 to 2.8 times the void volume of the granulated Trinidad Epuré when in the stored state.

14 Claims, No Drawings

MODIFIER FOR PAVING ASPHALT

BACKGROUND OF THE INVENTION (1) Field of the Invention

The present invention relates to a modifier for modifying paving asphalt and a paving asphalt composition. More particularly, the present invention relates to an asphalt modifier which can easily be handled at the step of mixing the modifier into asphalt and will exert a highly improved modifying effect. The invention also relates to a paving asphalt composition containing this modifier.

(2) Description of the Prior Art

As one conventional method for preparing a paving asphalt composition having an improved flow resistance, there can be mentioned a method in which 100 parts of paving petroleum asphalt having a low softening point (about 50° C.) is mixed with 25 to 100 parts of Trinidad Epuré having a higher softening point (about 90° to about 100° C.), whereby deformation of an asphalt-paved road, which is readily caused at a high temperature, for example, in summer, is prevented. By the term "Trinidad Epuré used herein, is meant a product obtained by purifying Trinidad lake asphalt, a kind of natural asphalt, which comprises 53 to 55% by weight of hard natural bitumen, 36 to 37% by weight of mineral substances, and 9 to 10% by weight of other substances.

In the method presently used with Trinidad Epuré as a modifier for modifying paving asphalt, there can be mentioned a method in which Trinidad Epuré is liquefied and is then added to asphalt and a method in which Trinidad Epuré is added in the solid state.

When Trinidad Epuré is used in the liquefied state, Trinidad Epuré taken out from a storage vessel is roughly broken and heated and melted in a kettle equipped with a stirrer. Then the melted Trinidad Epuré is mixed with paving petroleum asphalt after increasing the flowability of the melt by incorporation of an appropriate amount of paving petroleum asphalt, or the melt and paving petroleum asphalt are independently charged into a mixer for preparing the asphalt composition.

However, this method is defective in that long periods and a great deal of labor are necessary for pulverizing, heating and melting Trinidad Epuré, and because mineral substances contained in Trinidad Epuré are precipitated at the melting step, special care should be taken so as to prevent precipitation of these mineral substances at the melting and stirring step. Furthermore, areas where Trinidad Epuré can be used is restricted.

A method for using Trinidad Epuré in the solid state has been adopted in Germany. According to this method, Trinidad Epuré stored in the pulverized state is directly charged into a mixer for preparing an asphalt composition, or is added into a mastic-preparing cooker of a lorry equipped with a stirrer. This method is economically advantageous over methods using Trinidad Epuré in the liquefied state because the time is shortened and labor is saved.

When pulverized Trinidad Epuré is used in the solid state, it readily undergoes re-caking during storage, and it is necessary to prevent this re-caking. Conventional pulverized Trinidad Epuré, which has been subjected to re-caking-preventing treatment, include Trinidad Pulver and Trinidad Epureé Z. The former product comprises 50% by weight of finely divided Trinidad Epuré and 50% by weight of paving stone powder, and the latter product comprises Trinidad Epuré pulverized to a size of 12 to 0 mm and 3% by weight of diatomaceous earth, which is packed in a plastic bag.

In the case of trinidad Pulver, the bitumen content is as low as about 27% by weight, and transportation of Trinidad Pulver as the modifying bitumen is economically disadvantageous because stone powder should be transported. Furthermore, re-caking is caused at a high temperature according to the size of granulated Trinidad Epuré. In case of Trinidad Epuré Z, the bitumen content is satisfactorily high. However the content of diatomaceous earth is low, and if the absolute amount of diatomaceous earth is insufficient, and the average temperature is considerably higher than the method used in Germany, re-caking occurs and handling is difficult. Moreover, long-time storage is impossible. Therefore, both Trinidad Pulver or Trinidad Epuré Z are insufficient as asphalt modifiers.

SUMMARY OF THE INVENTION

It is a primary object of the present invention to provide a modifier for paving asphalt in which the above-mentioned defects of the conventional techniques are eliminated.

Another object of the present invention is to provide a paving asphalt composition comprising an improved modifier, which gives a pavement having improved properties.

Still another object of the present invention is to provide a paved road comprising a paving asphalt composition including an improved modifier.

These and other objects of the present invention can be attained by a modifier comprising granulated Trinidad Epuré having a predetermined size and a predetermined volume of a specific re-caking-preventing agent, in which re-caking is not in granulated Trinidad Epuré even if stored over long periods, handling is very easy when the modifier is incorporated in paving asphalt and a high modifying effect on paving asphalt can be attained. More specifically, in accordance with the present invention, there is provided a modifier for paving asphalt, which comprises granulated Trinidad Epuré having a maximum size of less than 25 mm, and as a re-caking-preventing agent a pulverant solid having a maximum size of less than about 2.5 mm, said solid being composed mainly of a substance having a higher softening point than the Trinidad Epuré compatibility with paving petroleum asphalt, wherein the volume of the powdery solid is 0.8 to 2.8 times the void volume of the granulated Trinidad Epuré when in the stored state.

DETAILED DESCRIPTION OF THE PREFERRED EMBODIMENTS

The present invention will now be described in detail.

In the present invention, the maximum size of granulated Trinidad Epuré is controlled to be less than 25 mm. The reason is that as the size of the granule is increased, the separation phenomenon becomes conspicuous and homogeneity is not ensured in a granule having a maximum size larger than 25 mm. Further the practical operation of charging and mixing in a mixer becomes difficult if the maximum size is larger than 25 mm. In order to shorten the mixing time in the mixer, it is preferred that the maximum size of granulated Trinidad Epuré be reduced to, for example, 12.5 mm or 5 mm so as to increase the melting speed of granulated Trinidad Epuré. Examples of the particulate size distribution and properties of granulated Trinidad Epuré are shown in Table 1.

the transporting method. Accordingly, in the present invention, the volume of the re-caking-preventing agent is controlled to be 0.8 to 2.8 times the void volume of granulated Trinidad Epuré in the stored state. In this

TABLE 1

| Size (mm) | Sieve (mm) Passing Ratio (%) | | | | | | | | Specific Gravity ($\gamma 1$) | Unit Volume Weight ($\gamma 2$) (g/cc) | Void Ratio (%) [($\gamma 1-2$)/1] |
|---|---|---|---|---|---|---|---|---|---|---|---|
| | 25 mm | 13 mm | 5 mm | 2.5 mm | 0.6 mm | 0.3 mm | 0.15 mm | 0.074 mm | | | |
| 25/0 | 100 | 58 | 25 | 10 | 3 | 2 | 1 | 0.3 | 1.41 | 0.90 | 36.2 |
| 5/0 | | | 100 | 52 | 12 | 8 | 4 | 1 | 1.41 | 0.75 | 46.8 |

The re-caking-preventing agent incorporated into the above-mentioned granulated Trinidad Epuré will now be described.

Re-caking of granulated Trinidad Epuré is caused by mutual interaction and contact of Trinida Epuré particles. Accordingly, re-caking can be prevented if the re-caking-preventing agent particles are located among the particles of granulated Trinidad Epuré so as to prevent mutual contact of the particles of granulated Trinidad Epuré. Therefore, it is necessary that the particles of the re-caking-preventing agent should fill in the voids defined by the particles of granulated Trinidad Epuré. In the present invention, in view of the foregoing, a re-caking-preventing agent that can be pulverized is used and the maximum size is controlled to be smaller than 2.5 mm. As the particle size is smaller, the unit volume weight is ordinarily reduced, and use of a re-caking-preventing agent having a smaller particle size is preferred. However, the operation of finely dividing the re-caking-preventing agent is costly and handling of finer particles becomes difficult.

When granulated Trinidad Epuré is stored, it is ordinarily packed in bags which are stacked. In this case, the re-caking speed is influenced mainly by the temperature and the pressure imposed on the particles in the accumulated state. Namely, the higher the temperature and the larger the load, the more increased is the re-caking speed.

Accordingly, in the present invention, while the actual conditions for using granulated Trinidad Epuré are taken into account, the temperature is set at 30° C. corresponding to the ordinary highest temperature in summer in the United States or at 40° C. corresponding to an abnormal temperature which may be experienced in the United States in summer. The pressure is set at a level produced when 10 of 25-Kg bags are stacked (in this case, the pressure applied to the bottom is about 0.1 Kg/cm$^2$). In the present invention, it is prescribed that Trinidad Epuré should be stored under these temperature and pressure conditions for at least 3 months.

It is considered that it is sufficient if the volume of the re-caking-preventing agent corresponds to the void volume of granulated Trinidad Epuré in the accumulated state. However, this volume differs according to the application method for the pavement, the storing method, the storing period, the storing temperature and the transporting method. Accordingly, in the present invention, the volume of the re-caking-preventing agent is controlled to be 0.8 to 2.8 times the void volume of granulated Trinidad Epuré in the stored state. In this case, the volume is converted to the weight by multiplying the volume by the unit volume weight of the re-caking-preventing agent.

The results of experiments conducted on the supposition of the foregoing conditions are shown in Table 2. The experimental procedures are as follows.

A sample is packed in a thickness of 7 cm in a cylinder having a diameter of 10 cm, and a pressure of 0.1 Kg/cm$^2$, which corresponds to the weight observed when 10 of 25-Kg bags are piled on the sample, is applied to the sample. The sample is placed in a thermostat furnace maintained at 30° or 40° C. for 90 days. The sample is carefully taken out from the cylinder and is let fall from a height of 1 m. When the sample breaks into crumbles, it is judged that re-caking is prevented.

From the foregoing experimental results, it has been found that an asphaltite powder having a higher softening point than Trinidad Epuré, such as a gilsonite powder, an asphalt pitch powder, a powder of a polymeric resin having a high softening point, such as an ethylene-vinyl acetate copolymer, an ethylene-ethyl acrylate copolymer or a polyolefin, a paving lime stone powder and a powder of a mineral substance such as cement, fly ash, slaked lime, kaolin or Aerosil are effective as the re-caking-preventing agent in the present invention, and that also mixtures of two or more of the foregoing substances are effective. In the case where a mineral substance alone is used, the effective content of bitumen in the total composition is reduced. Accordingly, it is preferred that such a mineral substance be used as an adjuvant together with other re-caking-preventing agent.

When asphaltite such as gilsonite, which is composed essentially of bitumen, is used as the re-caking-preventing agent, it not only acts as a re-caking-preventing agent but also enhances the effect of modifying paving petroleum asphalt and is utilized at a high efficiency as bitumen throughout the transportation, handling and use of the modifier. Accordingly, in this case, the economical advantage is increased.

The effects of modifying paving asphalt compositions by the modifier of the present invention including gilsonite are shown in Tables 3 and 4. Table 3 shows the results of the experiments made on hot rolled asphalt and Table 4 shows the results of the experiments made on Guss asphalt.

TABLE 2

| Amount of Re-Caking-Preventing Agent Necessary for Attaining Re-Caking-Preventing Effect | | | | | | | |
|---|---|---|---|---|---|---|---|
| Particle size of Trinidad Epure | | | Specific Gravity | Unit Volume Weight (g/cm) | 25-0 mm (void ratio of 36.2%) Volume (%) of Re-Caking Preventing Agent Corresponding to Void Ratio of | | 5-0 mm (void ratio of 46.8%) Volume (%) of Re-Caking Preventing Agent Corresponding to Void ratio of | |
| Group | Kinds and Weight ratios of Re-Caking Preventing Agents | | | | 30° C. | 40° C. | 30° C. | 40° C. |
| asphaltite | gilsonite (medium) | | 1.06 | 0.69 | 40 | 75 | 55 | 105 |

TABLE 2-continued

Amount of Re-Caking-Preventing Agent Necessary for Attaining Re-Caking-Preventing Effect

| Particle size of Trinidad Epure | | | | 25-0 mm (void ratio of 36.2%) Volume (%) of Re-Caking Preventing Agent Corresponding to Void Ratio of | | 5-0 mm (void ratio of 46.8%) Volume (%) of Re-Caking Preventing Agent Corresponding to Void ratio of | |
|---|---|---|---|---|---|---|---|
| Group | Kinds and Weight ratios of Re-Caking Preventing Agents | Specific Gravity | Unit Volume Weight (g/cm) | 30° C. | 40° C. | 30° C. | 40° C. |
| asphaltite | gilsonite (fine) | 1.06 | 0.56 | 30 | 65 | 45 | 90 |
| asphalt pitch | cracked asphalt pitch | 1.26 | 0.86 | 50 | 100 | 70 | 125 |
| polymeric resin | ethylene-vinyl acetate copolymer (EVA) | 0.95 | 0.37 | 40 | 80 | 55 | 100 |
| polymeric resin | ethylene ethyl acrylate copolymer (EEA) | 0.94 | 0.38 | 40 | 80 | 55 | 100 |
| polymeric resin | polyolefin | 0.97 | 0.45 | 45 | 85 | 60 | 105 |
| powdered mineral (adjuvant) | lime stone powder | 2.70 | 1.32 | 35 | 75 | 50 | 95 |
| powdered mineral (adjuvant) | Portland cement | 3.15 | 1.40 | 40 | 80 | 55 | 100 |
| powdered mineral (adjuvant) | fly ash | 2.12 | 0.98 | 35 | 70 | 50 | 95 |
| powdered mineral (adjuvant) | slaked lime | 2.33 | 0.65 | 30 | 60 | 40 | 85 |
| powdered mineral (adjuvant) | kaolin | 2.50 | 0.75 | 35 | 75 | 50 | 95 |
| powdered mineral (adjuvant) | aerosil | — | 0.06 | 30 | 60 | 40 | 80 |
| mixture | gilsonite (fine)/cracked asphalt pitch (1/1) | 1.16 | 0.66 | 45 | 90 | 60 | 110 |
| " | gilsonite (fine)/EEA (2/1) | 1.02 | 0.59 | 40 | 75 | 55 | 95 |
| " | cracked asphalt pitch/EEA (2/1) | 1.15 | 0.57 | 50 | 95 | 65 | 120 |
| " | gilsonite (fine)/lime stone powder (2/1) | 1.60 | 0.67 | 40 | 70 | 50 | 95 |
| " | cracked asphalt pitch/lime stone powder (2/1) | 1.75 | 0.88 | 50 | 95 | 60 | 115 |
| " | EEA/lime stone powder (2/1) | 1.53 | 0.54 | 40 | 80 | 50 | 100 |
| " | gilsonite (fine)/cracked asphalt pitch/lime stone powder (1/1/1) | 1.67 | 0.78 | 45 | 85 | 55 | 105 |
| " (1/1/1) | gilsonite (fine)/EEA/lime stone powder | 1.57 | 0.71 | 40 | 75 | 50 | 95 |
| " stone powder (1/1/1) | cracked asphalt pitch/EEA/lime | 1.63 | 0.68 | 45 | 90 | 60 | 115 |

TABLE 3

Results of Experiments made on Hot Rolled Asphalt

| | Unit | Conventional Technique | Present Invention | Present Invention |
|---|---|---|---|---|
| Components | | | | |
| crushed stone No. 5 | % by weight | 20 | 20 | 20 |
| crushed stone No. 6 | % by weight | 20 | 20 | 20 |
| coarse sand | % by weight | 28 | 28 | 28 |
| fine sand | % by weight | 19 | 19 | 19 |
| lime stone powder | % by weight | 4.7 | 5.0 | 5.3 |
| binder | % by weight | 8.3 | 8.0 | 7.7 |
| ingredients of binder | | | | |
| 80–100 asphalt | % by weight | 70 | 75 | 80 |
| Trinidad Epure 25-0 | % by weight | 30 | 18 | 12 |
| gilsonite (fine) | % by weight | — | 5 | 8 |
| bitumen content in composition | % by weight | 7.2 | 7.2 | 7.2 |
| Test Items | | | | |
| Marshall test (60° C.) | | | | |
| stability | Kg | 920 | 990 | 1070 |
| flow | 1/100 cm | 35 | 34 | 34 |
| wheel tracking test (dynamic stability)(tip embedded sample)(60° C., 64 Kg/cm$^2$) | turns/mm | 700 | 1150 | 1430 |

TABLE 4

| Results of Experiments Made on Guss Asphalt | | | | | |
|---|---|---|---|---|---|
| | Unit | Conventional Technique | Present Invention | Conventional Technique | Present Invention |
| Components | | | | | |
| crushed stone No. 6 | % by weight | 23.1 | 23.1 | 23.1 | 23.1 |
| crushed stone No. 7 | % by weight | 21.3 | 21.3 | 21.3 | 21.3 |
| coarse sand | % by weight | 13.0 | 13.0 | 13.0 | 13.0 |
| fine sand | % by weight | 13.9 | 13.9 | 13.9 | 13.9 |
| lime stone powder | % by weight | 20.3 | 20.8 | 19.6 | 20.4 |
| binder | % by weight | 8.4 | 7.9 | 9.1 | 8.3 |
| ingredients of binder | | | | | |
| 20–40 asphalt | % by weight | 75 | 82 | — | — |
| 60–80 asphalt | % by weight | — | — | 60 | 70 |
| Trinidad Epure | % by weight | 25 | 12 | 40 | 23 |
| gilsonite (fine) | % by weight | — | 6 | — | 7 |
| bitumen content in composition | % by weight | 7.5 | 7.5 | 7.5 | 7.5 |
| Test Items | | | | | |
| penetration of bitumen (25° C.) | 1/10 mm | 21 | 22 | 29 | 32 |
| softening point of bitumen (R & B) | °C. | 64 | 66 | 58 | 59 |
| intrusion test (40° C., 30 minutes) | mm | 1.5 | 1.3 | 1.9 | 1.4 |
| wheel tracking test (dynamic stability)(60° C., 64 Kg/cm$^2$) | turns/mm | 570 | 1050 | 450 | 790 |

As may be seen from the foregoing experimental results, when a modifier formed by incorporating gilsonite into Trinidad Epuré is used, the quality of a paving asphalt composition is drastically improved over the quality attained when Trinidad Epuré alone is used.

It is expected that a similar effect will be attained when an asphalt pitch composed of bitumen, which has a high softening point, is used as the re-caking-preventing agent.

It is known that a polymeric resin having a high softening point, such as an ethylene-vinyl acetate copolymer, an ethylene-ethyl acrylate copolymer or a polyolefin can be used as a modifier for paving petroleum asphalt. If this polymeric resin is used as an additional re-caking-preventing agent for Trinidad Epuré, the modifying effect is further enhanced.

When an asphaltite solid or polymeric resin solid is used as the re-caking-preventing agent, according to the type of paving petroleum asphalt or the type and use of the paving asphalt composition, the amount of the re-caking-preventing agent necessary only for obtaining the intended modifying effect may be smaller than the amount necessary for obtaining the intended re-caking-preventing effect in Table 2. In this case, since a re-caking occurs a mineral substance such as mentioned above, may be added as the adjuvant for compensating the insufficient re-caking-preventing effect while reducing the amount of the asphalt or polymeric resin. However, in this case, it is necessary that the amount of the adjuvant should be up to 45% by weight based on the total re-caking-preventing agent. If the amount of the adjuvant is controlled within this range, the sum of the entire bitumen content and the modifier is maintained at a level higher than the bitumen content (53 to 55% by weight) of Trinidad Epuré as the starting material, and no economical disadvantage is brought about.

As is apparent from the foregoing illustration, according to the present invention, re-caking of Trinidad Epuré can be sufficiently prevented in the actual application, and handling of granulated Trinidad Epuré can be facilitated and the effect of modifying paving asphalt can be enhanced. Therefore, a very excellent modifier for paving asphalt can be provided according to the present invention.

Furthermore, the present invention provides an improved paving asphalt composition comprising the above-mentioned modifier. Namely, according to the present invention, as shown in Tables 3 and 4, the above-mentioned modifier is used instead of Trinidad Epuré in a known paving apshalt composition such as hot rolled asphalt comprising inorganic paving materials such as about 30 to about 55% by weight of crushed stone (for example, crushed stone No. 5, 6 or 7), about 20 to about 60% by weight of sand and about 5 to about 30% by weight of lime stone powder, and about 6 to about 10% by weight of asphalt type binders and other necessary ingredients, or Guss asphalt having a similar composition. As is shown in Tables 3 and 4, the paving asphalt composition of the present invention is characterized in that the above-mentioned modifier is present in an amount of about 25 to about 100 parts by weight per 100 parts by weight of straight asphalt in the binder of the asphalt composition. As is apparent from the data shown in tables 3 and 4, this paving asphalt composition of the present invention has an improved quality.

Moreover, the present invention provides a road paved with the above-mentioned paving asphalt composition. This paved road can be provided by carrying out the paving operation by using the paving asphalt composition of the present invention according to known paving methods, and the paved road has excellent properties as described above.

We claim:

1. A modifier for paving asphalt, which consists essentially of a mixture of granulated Trinidad Epuré having a maximum size of less than 25 mm, and a pulverulent solid for preventing recaking of said granulated Trinidad Epuré during storage thereof, said pulverulent solid having a maximum size of less than 2.5 mm, a higher softening point than said granulated Trinidad Epuré and compatibility with paving petroleum asphalt, wherein the volume of said pulverulent solid is 0.8 to 2.8 times the void volume of the granulated Trinidad Epuré when in the stored state, and further wherein said pulverulent solid is selected from one or more members of the group consisting of asphaltite powder, asphalt pitch powder, polymeric resin powder, paving limestone powder, and mineral powder.

2. A modifier for paving asphalt according to claim 1, wherein the pulverulent solid is an asphaltite having a higher softening point than Trinidad Epuré.

3. A modifier for paving asphalt according to claim 1, wherein the pulverulent solid is a solid of asphalt pitch having a higher softening point than Trinidad Epuré.

4. A modifier for paving asphalt according to claim 1, wherein the pulverulent solid is a solid of a polymeric resin having a higher softening point than Trinidad Epuré.

5. A modifier for paving asphalt according to claim 1, wherein the pulverulent solid is a mixture comprising at least two members selected from the group consisting of asphaltite having a higher softening point than Trinidad Epuré, asphalt pitch having a higher softening point than Trinidad Epuré, and a polymeric resin having a higher softening point than Trinidad Epuré.

6. A modifier for paving asphalt according to claim 1 wherein the pulverulent solid comprises as a main component, an asphaltite having a higher softening point than Trinidad Epuré, an asphalt pitch having a higher softening point than Trinidad Epuré, a polymeric resin having a higher softening point than Trinidad Epuré or a mixture of two or more of said solids and as an adjuvant, a powder of a mineral substance.

7. A paving asphalt composition comprising an inorganic paving filler material and an asphaltic binder, said binder comprising 100 parts by weight of paving petroleum asphalt to 25 to 100 parts by weight of an asphalt modifier, said modifier consisting essentially of a mixture of granulated Trinidad Epuré having a maximum size of less than 25 mm and a pulverulent solid for preventing recaking of said granulated Trinidad Epuré during storage thereof, said pulverulent solid having a maximum size of less than 2.5 mm, a higher softening point than Trinidad Epuré and compatibility with paving petroleum asphalt, wherein the volume of said pulverulent solid is 0.8 to 2.8 times the void volume of the granulated Trinidad Epuré when in the stored state, and further wherein said pulverulent solid is selected from one or more members of the group consisting of asphaltite powder, asphalt pitch powder, polymeric resin powder, paving limestone powder, and mineral powder.

8. A paving asphalt composition according to claim 7, wherein the solid is an asphaltite having a higher softening point than Trinidad Epuré.

9. A paving asphalt composition according to claim 7, wherein the solid is an asphalt pitch having a higher softening point than Trinidad Epuré.

10. A paving asphalt composition according to claim 7, wherein the solid is a polymeric resin, having a higher softening point than Trinidad Epuré.

11. A paving asphalt composition according to claim 7, wherein the solid is a mixture comprising at least two members selected from the group consisting of an asphaltite having a higher softening point than Trinidad Epuré, an asphalt pitch having a higher softening point than Trinidad Epuré, and a polymeric resin having a higher softening point than Trinidad Epuré.

12. A paving asphalt composition according to claim 7, wherein the pulverulent solid comprises as a main component, an asphaltite which has a higher softening point than Trinidad Epuré, an asphalt pitch which has a higher softening point than Trinidad Epuré, a polymeric resin which has a higher softening point than Trinidad Epuré, or a mixture of two or more of said solids, and as an adjuvant, a powder of a mineral substance.

13. A paved road material which is paved with a paving asphalt composition comprising an inorganic paving filler material and an asphaltic binder comprising 100 parts by weight of paving petroleum asphalt to 25 to 100 parts by weight of an asphalt modifier, said modifier consisting essentially of a mixture of granulated Trinidad Epuré having a maximum size of less than 25 mm and a pulverulent solid for preventing recaking of said granulated Trinidad Epuré during storage thereof, said pulverulent solid having a maximum size of less than 2.5 mm, a higher softening point than Trinidad Epuré and compatibility with paving petroleum asphalt, wherein the volume of said pulverulent solid is 0.8 to 2.8 times the void volume of the granulated Trinidad Epuré when in the stored state, and further wherein said pulverulent solid is selected from one or more members of the group consisting of asphaltite powder, asphalt pitch powder, polymeric resin powder, paving limestone powder, and mineral powder.

14. A method of preventing recaking in granulated Trinidad Epuré in the stored state by adding to said Trinidad Epuré the pulverulent solid of claim 1.

* * * * *